United States Patent [19]

Nagashima

[11] Patent Number: 4,691,365
[45] Date of Patent: Sep. 1, 1987

[54] IMAGE READING APPARATUS

[75] Inventor: Nao Nagashima, Kanagawa, Japan

[73] Assignee: Canon Kabushiki Kaisha, Tokyo, Japan

[21] Appl. No.: 614,239

[22] Filed: May 25, 1984

[30] Foreign Application Priority Data

Jun. 1, 1983 [JP] Japan .................................. 58-97168

[51] Int. Cl.⁴ .............................................. G06K 9/36
[52] U.S. Cl. ...................................................... 382/54
[58] Field of Search ........................... 382/50, 53, 49; 358/282, 213; 250/205; 235/455

[56] References Cited

U.S. PATENT DOCUMENTS

| | | | |
|---|---|---|---|
| 4,314,281 | 2/1982 | Wiggins et al. | 382/54 |
| 4,408,231 | 10/1983 | Bushaw et al. | 382/50 |
| 4,430,748 | 2/1984 | Tuhro et al. | 382/50 |
| 4,464,789 | 8/1984 | Sternberg | 382/49 |
| 4,541,116 | 9/1985 | Lougheed | 382/54 |

Primary Examiner—Stephen A. Kreitman
Attorney, Agent, or Firm—Fitzpatrick, Cella, Harper & Scinto

[57] ABSTRACT

An image reading apparatus has a CCD for reading an original image, a standard white plate for providing a standard image signal, a control circuit for controlling light amount and temperature of a fluorescent lamp as a light source, a CPU for controlling the operation sequence of the overall apparatus, a RAM for storing a standard image signal corresponding to the standard white plate, a ROM storing a control program for the CPU, and a display for displaying an error. An image signal of an original read by the CCD is corrected in accordance with the standard image signal. For example, an average value of a block of four pixel image signals, for example, is calculated and is compared with an average value of the standard image signals obtained by reading the standard surface a plurality of times. An abnormal pixel signal is replaced with an immediately preceding normal pixel signal or a predetermined signal pattern. An abnormal light amount or temperature of the fluorescent lamp is detected in accordance with the standard signal corresponding to the standard surface exposed by the lamp.

38 Claims, 19 Drawing Figures

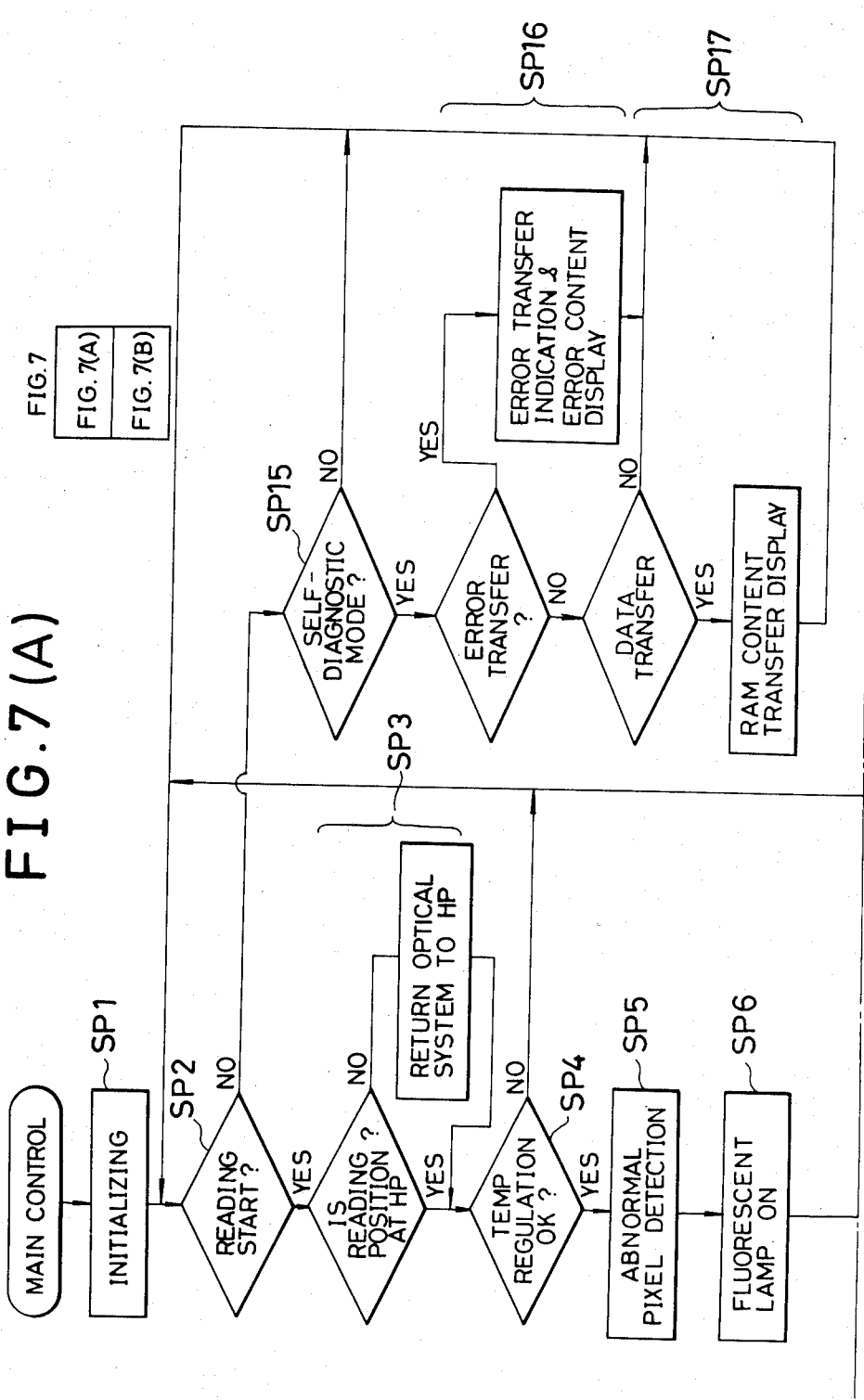

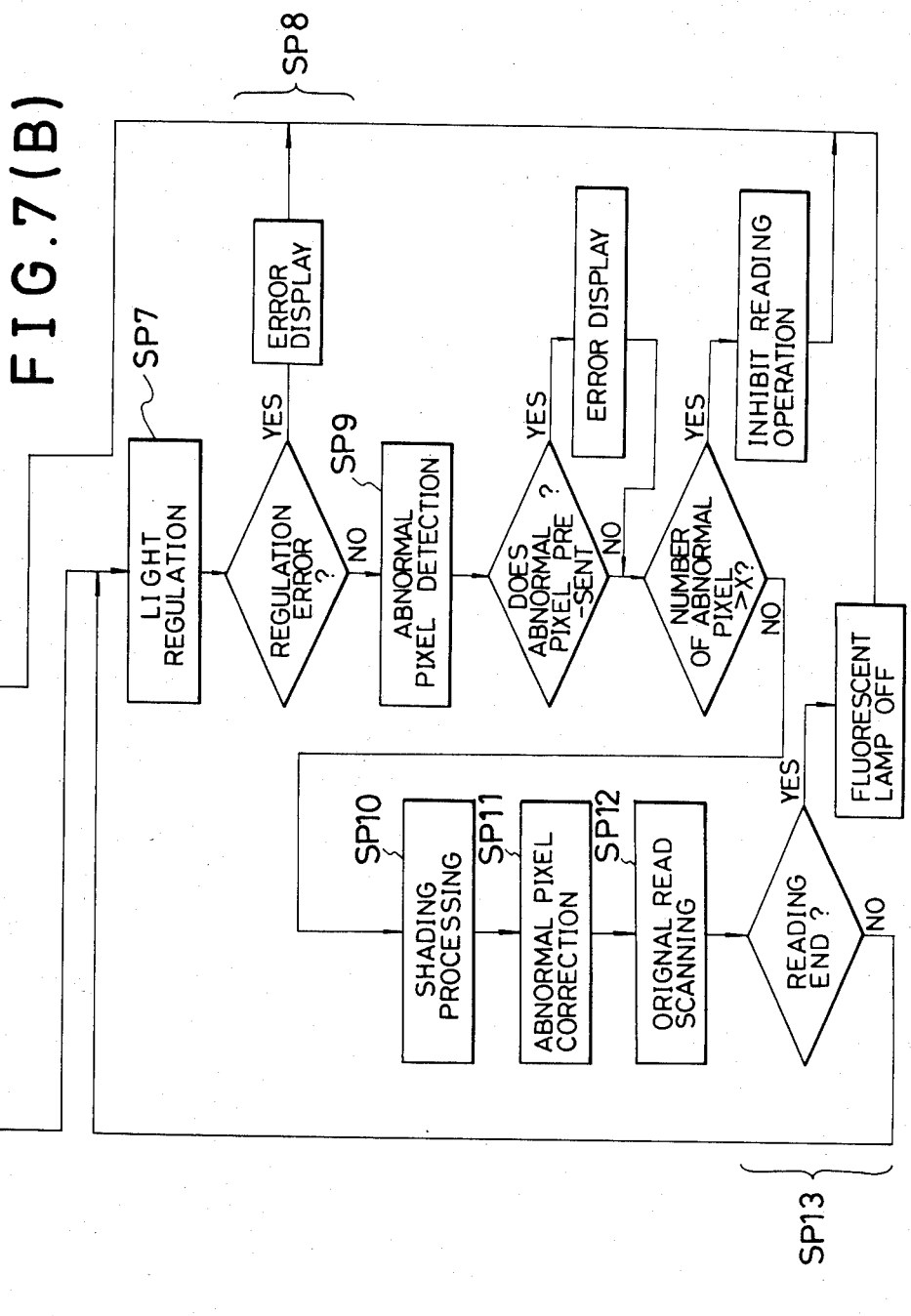

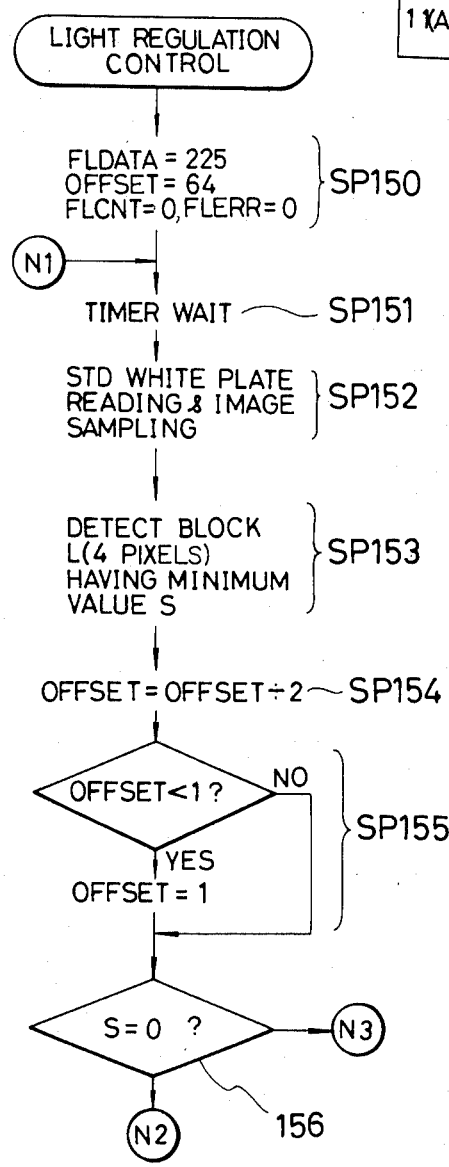

IMAGE READING APPARATUS

BACKGROUND OF THE INVENTION

1. Field of the Invention

The present invention relates to an image reading apparatus for electrically reading image data and, more particularly, to an image reading apparatus for forming image signals which reflect original image well.

2. Description of the Prior Art

Apparatuses have been recently devised and used which read original images utilizing solid-state image sensors such as CCDs, convert the obtained electrical analog signals into digital signals, and reproduce images with a printer or transmit the signals to a remote location.

In an apparatus of this type, an image signal correction circuit is frequently incorporated so as to electrically correct the image signals to eliminate the adverse effects of irregularities in the light emission by a fluorescent lamp, light emission variations in an optical system, or sensitivity fluctuations of the CCD, thereby stabilizing the operation. When an image signal correction circuit of this type is designed especially for an apparatus which handles high-speed image signals, expensive circuit elements must be used to allow high speed operation. For this reason, when complex correction processing or high precision signal processing is to be performed, the circuit size must be increased and the cost becomes higher.

An image signal correction circuit is known in which an image signal corresponding to a standard white plate is stored in a memory or the like as a digital correction signal, and the image signal corresponding to an original is corrected in accordance with this correction signal. In this circuit, when high-speed processing is performed, a high level of noise is introduced in the correction signal stored in the memory or the like. In one method of eliminating such noise, an average value of adjacent pixels is calculated.

For this purpose, extra circuit elements such as adders, multipliers, or timing circuits for controlling the operation timings of the respective circuit elements are required. Such circuit elements, moreover, must be able to operate at high speed and are therefore expensive.

In an apparatus having such an image signal correction circuit, even if a read image has some defect, there is no method other than producing a hard copy with a printer or the like to check the image quality. For this reason, detection of defects in the image quality is time-consuming. This has decreased productivity at factories and degraded maintenance and other services.

In an apparatus of the type described above, the amount of light from an illuminating means is controlled so as to reproduce a read image at a constant density level.

However, if a fluorescent lamp or the like used as the illuminating means is burnt out or is degraded in quality or the light regulating circuit becomes abnormal, a satisfactory method for detecting such as defect has not yet been established, and detection of such a defect is thus time-consuming.

According to a general light regulating method adopted in such an apparatus, an electrical signal corresponding to a standard white plate is obtained and is sampled at a specific timing in each frame, and the light regulation of the illuminating means is performed based on the thus obtained density data.

However, the fluorescent lamp used as the illuminating means has an irregular luminous intensity distribution. Therefore, if the light regulation is performed in accordance with density data which is obtained at such a specific timing, the electrical signal may saturate in the remaining portion of the signal frame, or the amount of illuminated light may become insufficient. In either case, satisfactory light regulation cannot be performed. Furthermore, when light regulation is performed with the fluorescent lamp in the cold state, the lamp cannot be turned on immediately and satisfactory light regulation cannot be performed.

In an apparatus of this type, when the tube wall temperature of the fluorescent lamp deviates from the suitable operating range, it becomes difficult to turn on the lamp and the luminous efficacy of the lamp is decreased. When image reading is performed under such conditions, the obtained image quality is degraded and flickering noise may be included in the read image.

In order to determine if a normal image is being reproduced in an apparatus of this type, a printer or the like must be actually connected to the apparatus so as to check with a hard copy. In order to allow easy monitoring on an oscilloscope, a pattern must be generated repeatedly. For this purpose, a special test pattern generator is externally connected to the apparatus.

Detection of a fault is a time-consuming operation if such a test pattern generator is not available.

In an apparatus of the type described above, a fluorescent lamp is most frequently used for illuminating an original due to its good luminous efficacy. However, when a fluorescent lamp is used in practice, the tube wall temperature must be maintained within a predetermined range so as to allow efficient light emission. Since the light amount distribution of the tube is not uniform, so-called shading correction must be performed. In addition to this, since the amount of light of the lamp changes over time and depends upon the total or cumulative ON hours, the light amount control must be performed so as to allow stable image reading.

SUMMARY OF THE INVENTION

The present invention has been made in consideration of this and has as its object to provide an image reading apparatus having a simple configuration which can reliably form an image signal.

It is another object of the present invention to simplify at low cost the circuit configuration by performing image signal processing at low speed using elements having operating functions such as a microcomputer, since processing for image signal formation can be performed at relatively low speed.

It is still another object of the present invention to simultaneously allow various types of processing such as the checking of the operating state of an illumination circuit or an image pickup device, light regulation or the like, by storing image signals other than correction signals in a memory or the like and using a microcomputer.

It is still another object of the present invention to provide an image reading apparatus which comprises a memory for storing a signal obtained by reading a standard surface, means for operating based on the signal stored in the memory, and means for correcting an image read signal in accordance with the operated standard signal.

It is still another object of the present invention to provide an image reading apparatus which corrects an image read signal in accordance with an average value of signals obtained by reading a standard surface a plurality of times.

It is still another object of the present invention to provide an image reading apparatus which comprises a memory for storing a signal obtained by reading a standard surface, means for correcting an image read signal in accordance with the signal stored in the memory, and means for monitoring the signal stored in the memory.

It is still another object of the present invention to provide an image reading apparatus which calculates an average value of the signals obtained by reading a standard surface and compares the average value with a signal level of each pixel so as to detect an abnormal pixel.

It is still another object of the present invention to provide an image reading apparatus which detects an abnormal pixel in accordance with a plurality of signals which are obtained by reading a standard surface under different conditions.

It is still another object of the present invention to provide an image reading apparatus wherein when an abnormal pixel is detected during image reading, the corresponding pixel signal is replaced by a signal of an immediately preceding normal pixel.

It is still another object of the present invention to provide an image reading apparatus which corrects an abnormal pixel detected during image reading and which displays the occurrence of such an abnormal pixel.

It is still another object of the present invention to provide an image reading apparatus which detects an abnormality of a light source in accordance with a signal obtained by reading a standard surface which is exposed by the light source.

It is still another object of the present invention to provide an image reading apparatus which controls the amount of light emitted by a light source so that a peak value of a signal obtained by reading a standard surface exposed by the light source is kept at a predetermined value.

It is still another object of the present invention to provide an image reading apparatus which inhibits further image reading when the amount of light emitted by a light source is below a predetermined value during reading of an image exposed by the light source.

It is still another object of the present invention to provide an image reading apparatus which inhibits further image reading when the temperature of a light source falls below a predetermined level during reading of an image exposed by the light source.

It is still another object of the present invention to provide an image reading apparatus which is capable of producing, onto a line for transferring a signal obtained by image reading to a signal processing means, an image signal of a predetermined pattern in place of an image read signal by inputting a predetermined signal.

It is still another object of the present invention to provide an image reading apparatus which is capable of repeatedly producing an image signal of a predetermined pattern in place of an image input signal by writing a predetermined pattern in a memory means for performing data readout in synchronism with the image input signal.

It is still another object of the present invention to provide an image reading apparatus which performs light regulation control of a light source after temperature regulation of the light source and thereafter performs correction of a read signal during reading of an image exposed by the light source.

The above and other objects, features and effects of the present invention will become apparent from the following description taken in conjunction with the accompanying drawings.

BRIEF DESCRIPTION OF THE DRAWINGS

FIG. 7, consisting of FIGS. 7(A) and 7(B), is a control flow chart of a main body control 23 of the apparatus;

DETAILED DESCRIPTION OF THE PREFERRED EMBODIMENTS

The preferred embodiment of the present invention will now be described with reference to the accompanying drawings.

Figure 1:
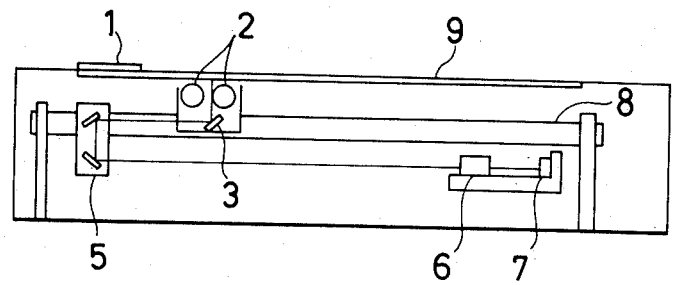
FIG. 1 is a schematic view showing an original reading apparatus to which the present invention can be applied.

FIG. 1 is a schematic view showing an original reading apparatus to which the present invention may be applied.

An original placed on an original table 9 with its image surface facing downward is illuminated with light from fluorescent lamps 2. The light reflected from the original is guided by reflecting mirrors 3 and 5 and an optical lens 6 and forms an original image on a CCD 7 for line reading, thereby performing main scanning of an original. The fluorescent lamp 2 and the reflecting mirrors 3 and 5 are moved along guide rails 8 by an optical system drive motor (not shown) so as to scan the original placed on the original table 9, thereby performing sub scanning. The CCD 7 has a plurality of image sensors which convert the original image into an electrical signal. In this embodiment, shading is eliminated by electrical processing to be described later. Shading in this case includes irregularities in light emission of the fluorescent lamp 2, density fluctuations due to contamination of the reflecting mirrors 3 and 5 or the like and light emission variations of the optical lens 6. In this embodiment, a standard white plate 1 is read before scanning the original. Thereafter, image signal correction is performed based on the read signal obtained by reading the standard white plate 1. The standard white plate 1 is a plate for obtaining a standard image signal to be used for correcting the image signals and is a plate, the entire surface of which is painted white.

Figure 2:
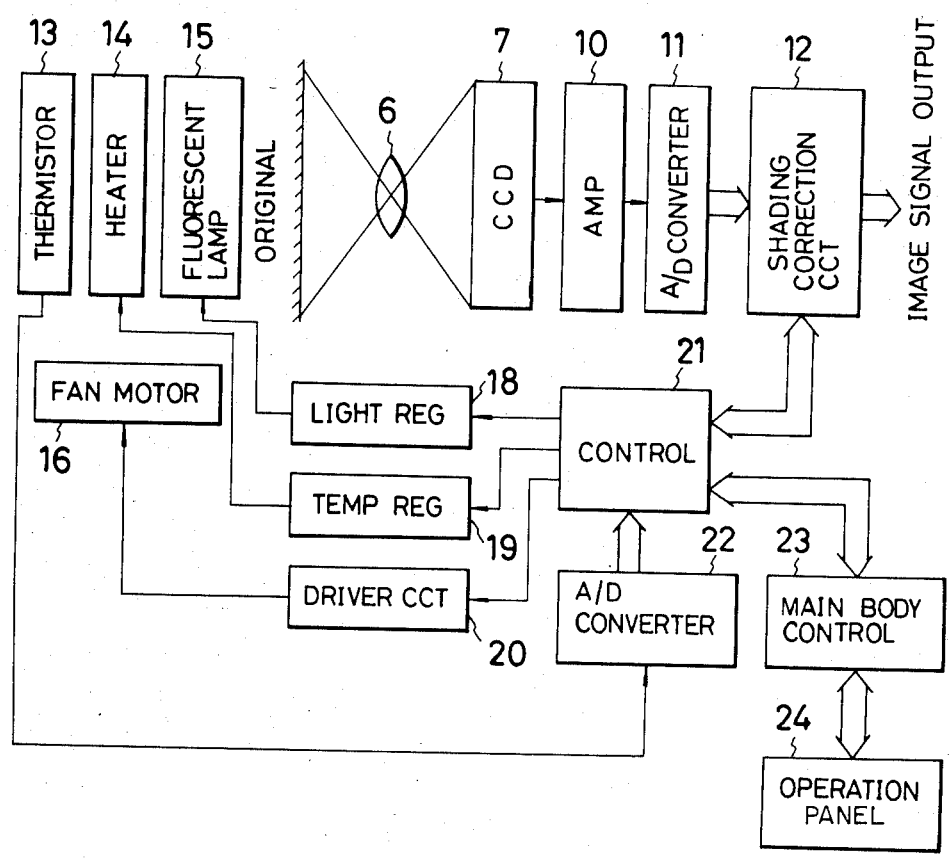
FIG. 2 is a block diagram of an electrical circuit for performing shading correction in accordance with an embodiment of the present invention.

FIG. 2 is a block diagram showing the configuration of a circuit of an original reading apparatus which is capable of performing image signal correction in accordance with the present invention.

An original is illuminated by a fluorescent lamp 15. The reflected light from the original is guided onto a CCD 7 having a plurality of image sensors through an optical lens 6. (Mirrors 3 and 5 are omitted.) The CCD 7 converts the original image into electrical signals in units of pixels and produces analog electrical signals of one main scanning line in synchronism with a sync signal for main scanning.

An amplifier 10 amplifies the analog electrical signal and an amplified signal from the amplifier 10 is converted into a digital signal by an A/D converter 11. The digital signal from the A/D converter 11 is subjected to shading correction by a shading correction circuit 12 and a shading-corrected signal from the circuit 12 is produced externally as a digital image signal.

The external circuit can be a binary signal processor such as a digitizer or a dither processor. A digital signal so obtained may be inputted into equipment such as an LBP, an image electronic file, or a teletex.

Referring to FIG. 2, a control 21 controls the shading correction circuit 12 and performs temperature control, light regulation or the like for the fluorescent lamp 15 in response to commands from a main body control 23.

An operation panel 24 is connected to the main body control 23 so as to give a start timing command to the original reading and control display of the apparatus status.

A light regulator 18 is a control circuit for controlling the amount of light emitted from the fluorescent lamp 15. In response to a signal from the control 21, the light regulator 18 controls the ON time of the lamp 15 by pulse width modulation.

A thermistor 13 is a temperature sensor for measuring the tube wall temperature of the lamp 15. A measurement output from the thermistor 13 is A/D converted by an A/D converter 22. A digital signal output from the A/D converter 22 is supplied to the control 21. In response to this input signal, the control 21 controls a heater 14 and a cooling fan motor 16 through a temperature regulator 19 and a driver circuit 20, respectively. Thus, the tube wall temperature of the lamp 15 is kept at about 40° C. at which the lamp efficacy is highest and the light emission is most stable.

More specifically, the tube wall temperature of the lamp 15 is measured by the thermistor 13. When the measured temperature is 40° C. or lower, the heater 14 is turned on and the fan motor 16 is turned off. However, if the measured temperature is higher than 40° C., the heater 14 is turned off while the fan motor 16 is turned on so as to perform temperature regulation. In practice, heat generated by the lamp itself must also be considered. Therefore, the ON/OFF temperature must have hysteresis characteristics.

Figure 3:
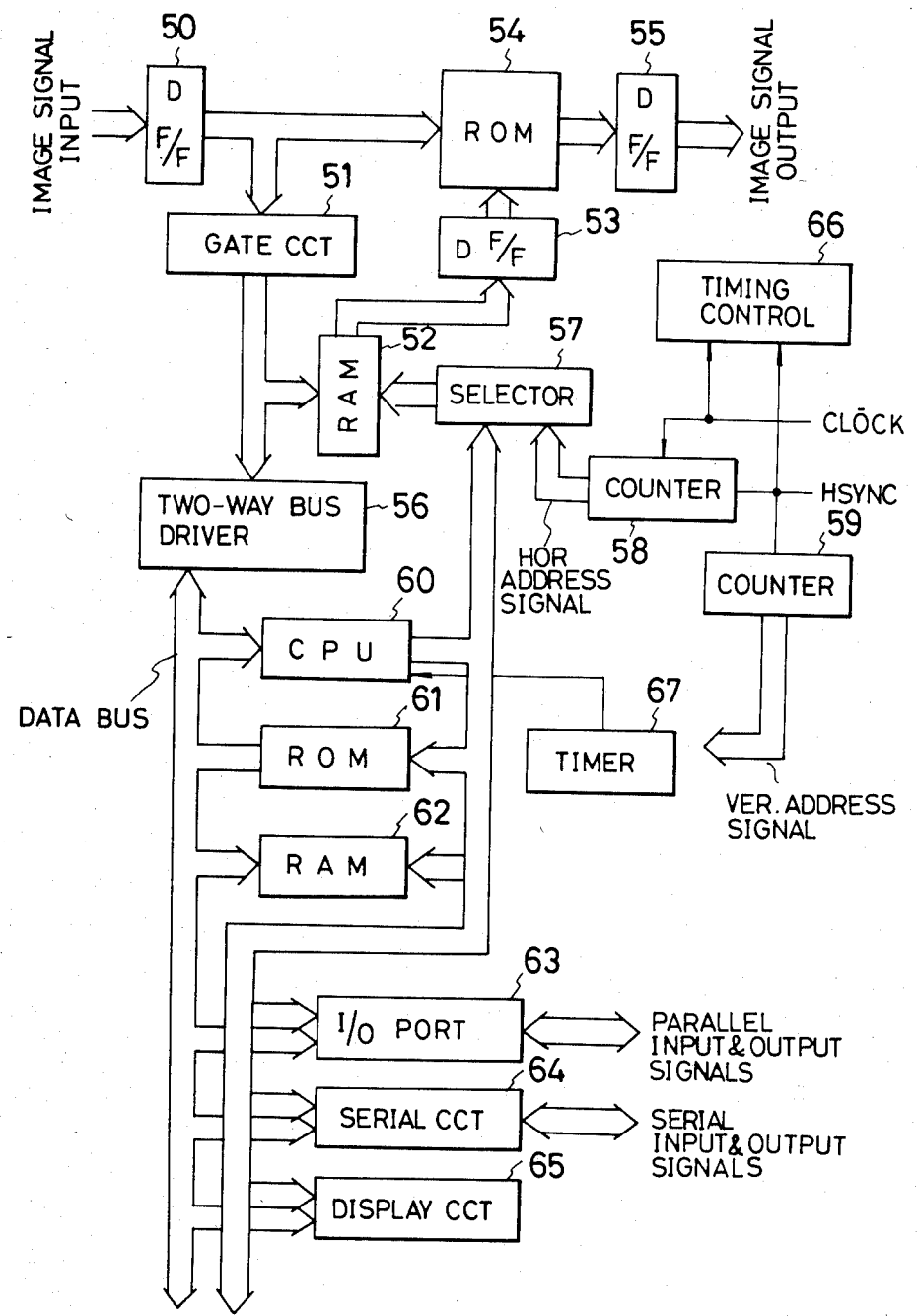
FIG. 3 is a detailed block diagram of the circuit shown in FIG. 2.

FIG. 3 is a detailed block diagram of the shading correction circuit 12 and the control 21.

A 6-bit image signal produced from the A/D converter 11 is timing corrected by a D flip-flop (D F/F) 50. The signal from the D F/F 50 is supplied to a ROM 54 storing a calculation result of a shading correction and is subjected to a correction thereby. An output signal from the D F/F 50 is also supplied to a RAM 52 through a gate circuit 51 so as to store image signals of one CCD line in the RAM 52 as needed.

The RAM 52 stores an image signal corresponding to the standard white plate 1. This signal is read out from the RAM 52 in synchronism with an actual original read signal. The readout signal is supplied onto an address signal line of the ROM 54. Then, the operation result of the shading correction stored in the ROM 54 is read out so as to perform shading correction to overcome irregularities of the light emission of the fluorescent lamp 15, density fluctuations due to contamination of the reflecting mirrors 3 and 5, or luminous intensity variations of the optical lens 7.

A D F/F 53 is a circuit for controlling the timing of an image signal read out from the RAM 52.

A selector 57 selects one or the other of an address signal supplied from a CPU 60 and a count signal (=horizontal address signal) of a counter 58 for counting a CLOCK signal for reading out a pixel signal from the CCD 7. When the image signal data of the standard white plate 1 is written in the RAM 52 and shading correction is performed in accordance with the signal read out from the RAM 52, the selector 57 selects the horizontal address signal of the counter 58. On the other hand, when the contents of the RAM 52 are directly read out by the CPU 60, the selector 57 selects the address signal from the CPU 60.

The counter 58 is reset or cleared in response to each synch signal HSYNC representing the start of one main scanning line, and repeats the counting operation for each main scanning line.

A counter 59 serves to count the HSYNC signals. The counter 59 is used, for example, for changing the pattern in the sub scanning direction for performing dither processing.

A timing control 66 controls the selector 57, the gate circuit 51, and a two-way bus driver 56 in response to a command from the CPU 60.

The timing control 66 performs control of the following three types of operation mode:

(1) Shading data sampling mode

The operation mode in which the image signal obtained by reading the standard white plate 1 is stored in the RAM 52. The gate circuit 51 is energized for the interval of one main scanning line represented by the HSYNC signal. The selector 57 is operated to select the address signal from the counter 58. The image signal is written in the RAM 52.

(2) Shading correction mode

An image signal supplied to the D F/F 50 is corrected in accordance with the image signal written in the RAM 52. In this mode, the selector 57 also selects the address signal from the counter 58. The data written in the RAM 52 in the shading data sampling mode described above is read out from the RAM 52. Shading correction is performed in the ROM 54 at a timing controlled by the D F/F 53. The gate circuit 51 is not energized in this mode.

(3) CPU mode

The operation mode in which data is written into or is read out from the RAM 52 directly by the CPU 60. In this mode, the two-way bus driver 56 is activated and is directly connected to the data bus of the CPU 60. The contents of the RAM 52 are read out or updated. In this mode, the selector 57 is switched to the address signal line of the CPU 60. The gate circuit 51 is not activated in this mode.

The CPU 60 performs the control operation using a working RAM 62, an I/O port 63, a serial circuit 64, and a display circuit 65 in accordance with a control program stored in a ROM 61. The display circuit 65 has an error display function so as to signal to the user or a service person various types of error to be described later.

A timer 67 supplies pulses of a constant period to the CPU 60. The CPU 60 uses these pulses as interrupt signals so as to control the timings.

The principle of light regulation will be described with reference to FIG. 4.

Figure 4:
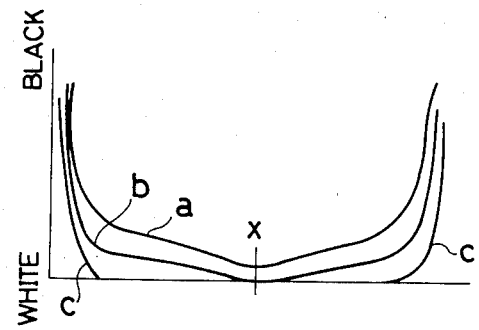
FIG. 4 is a graph for explaining the principle of light regulation control.

Referring to FIG. 4, the interval of one frame (corresponding to one line of the CCD 7) is plotted along the axis of abscissa, and the density level of the image signal is plotted along the axis of ordinate. In this embodiment, this corresponds to the data which is obtained by reading the standard white plate 1 and stored in the RAM 52 in the shading data sampling mode.

In this embodiment, 6-bit data is stored in the RAM 52. A value 63 of the 6-bit data corresponds to the darkest level, while a value 0 corresponds to the brightest level.

Referring to FIG. 4, curve a corresponds to the case wherein the amount of light from the fluorescent lamp 15 is not sufficient, curve b corresponds to the case wherein the amount of light is correct, and curve c corresponds to the case wherein the amount of light is too great. The shading correction method used in this method utilizes the data obtained by reading the standard white plate 1. Therefore, correction cannot be performed when the reading is saturated as in the case represented by curve c.

When the amount determined of light is insufficient as in the case of curve a, the correction amount by calculation becomes too great, so that the S/N ratio of the image signals is degraded. Therefore, the amount of light of the fluorescent lamp 15 must be controlled according to the curve b wherein point x corresponding to the brightest portion of the readout data has the value 0.

Figure 5:
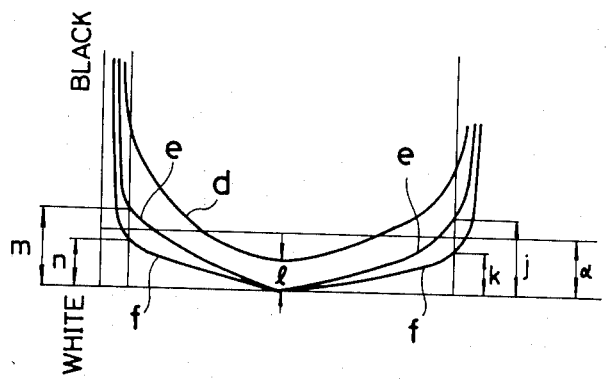
FIG. 5 is a graph for explaining the principle of detecting degradation of a fluorescent lamp 15.

FIG. 5 is a graph showing data stored in the RAM 52 after light regulation of the fluorescent lamp 15 is performed using the standard white plate 1 when the fluorescent lamp 15 is degraded.

Referring to FIG. 5, curve d corresponds to the case wherein the degradation of the fluorescent lamp 15 is significant, the black level of a value 1 is present even in the fully on state, and the light regulation is unsatisfactory.

Curve e corresponds to the case wherein blackening at the ends of the fluorescent lamp 15 is significant and the amount of light emitted from the end portions of the lamp is low.

Curve f corresponds to normal data. The density levels at the ends of the effective interval of one frame in this normal data are respectively designated by n and k. Similarly, the density levels at the ends of the effective interval of the curve, e are designated by m and j.

As has been described hereinabove, in the shading correction operation according to this embodiment, the S/N ratio is degraded if the read value from the standard white plate 1 is low, as in the case of the curve a shown in FIG. 4. In order to prevent this, the lowest limit of the brightness is defined to be a predetermined value $\alpha$. This predetermined value is compared with density levels at the ends of the effective interval so as to detect degradation of the fluorescent lamp 15.

The graph of FIG. 5 corresponds to the case wherein $m > \alpha > n$ and $i > \alpha > k$. In detecting the degradation of the fluorescent lamp 15, it is, of course, preferable to detect the degradation of the lamp 15 when only one end of the effective interval exceeds the predetermined value $\alpha$, such as when $m > \alpha$ or $j < \alpha$.

Figure 6:
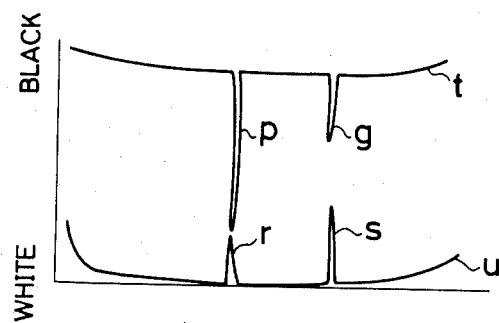
FIG. 6 is a graph for explaining the principle of detecting an abnormal pixel.

FIG. 6 is a graph for explaining the detection of a fault present in the CCD 7, RAM 52 or the like and the resultant image has a corresponding defect.

In general, when such a fault occurs, the density level of the corresponding pixel becomes a specific value and the dynamic range is significantly degraded. Referring to FIG. 6, curve t shows the readout data from the RAM 52 when the fluorescent lamp 15 is dark, and curve u shows the readout data in a bright state after light regulation of the fluorescent lamp 15. Peak values p and r correspond to the case wherein the density of the defective pixel has a specific value. Peak values g and s correspond to the case wherein the dynamic range of the defective pixel is lowered.

In order to detect a defective pixel from such data, the difference between every two adjacent pixels is calculated. When the difference exceeds a predetermined value, a defective pixel is detected. However, according to this method, when there are more than one abnormal pixels in a row, the difference between such pixels is small, and they may therefore fail to be detected.

Accordingly, in this embodiment, the average density level for each of the curves t and u is calculated. Each pixel is compared with the obtained average value. When the difference between the pixel and the average value exceeds a predetermined value, a defective pixel is detected. The above-mentioned problem is thus obviated.

When the density level of a defective pixel happens to be close to the average level, the abnormal pixel may not be detected. In view of this, it is preferable to detect abnormal pixels in accordance with two or more density levels. In this embodiment, detection of abnormal pixels is performed in accordance with data corresponding to ON and OFF states of the fluorescent lamp 15.

The control procedures of the apparatus of the embodiment of the present invention will be described with reference to the flow charts shown in FIGS. 7 to 14.

FIG. 7 is a flow chart showing the main control procedure of the main body control 23.

When power is turned on, initialization of the operation panel 24 and other drivers is performed in step SP1. The polling operation for starting the reading operation is also performed.

In step SP2, if the switch for starting the reading operation at the operation panel 24 has been depressed, a branch is made in accordance with the decision or discrimination result.

When the switch is detected to have been depressed, the flow advances to step SP3. In step SP3, it is discriminated if the reading position is at a home position HP corresponding to the standard white plate 1. If NO in step SP3, the optical system is returned to the home position HP and the flow goes to step SP4 after confirming that the optical system has been returned to the home position HP. In step SP4, it is checked if the temperature regulation for maintaining the tube wall temperature of the fluorescent lamp 15 at the predetermined temperature (40° C.) is completed. If NO in step SP4, stable image reading cannot be guaranteed and original reading start is inhibited. If YES in step SP4, the flow advances to step SP5.

In step SP5, the standard white plate 1 is read in the OFF state of the fluorescent lamp 15 and abnormal pixel detection is performed. In step SP6, the fluorescent lamp 15 is turned on. In step SP7, light regulation of the fluorescent lamp 15 is performed.

In step SP8, it is checked if any light regulation error has been caused. If YES in step SP8, an error display is performed and the original reading is inhibited.

If NO in step SP8, the flow advances to step SP9. In step SP9, the standard white plate 1 is read in the ON state of the fluorescent lamp 15 so as to perform abnormal pixel detection. The flow then advances to step SP10. If the number of abnormal pixels detected exceeds a predetermined number X, an error display is performed and the reading operation is inhibited.

In step SP10, the read value of the standard white plate 1 is stored in the RAM 52.

In step SP11, correction of the abnormal pixels detected in steps SP5 and SP9 is performed. Thereafter, in step SP12, reading scanning of the original is started.

In step SP13, it is checked if the number of reading operations of the originals has exceeded the required number. If NO in step SP13, the flow returns to step SP7, and the above operation is repeated.

When YES in step SP13, the fluorescent lamp 15 is turned off. The reading operation of the original is completed and the apparatus is set in the standby state awaiting depression of the reading start switch.

Figure 8:
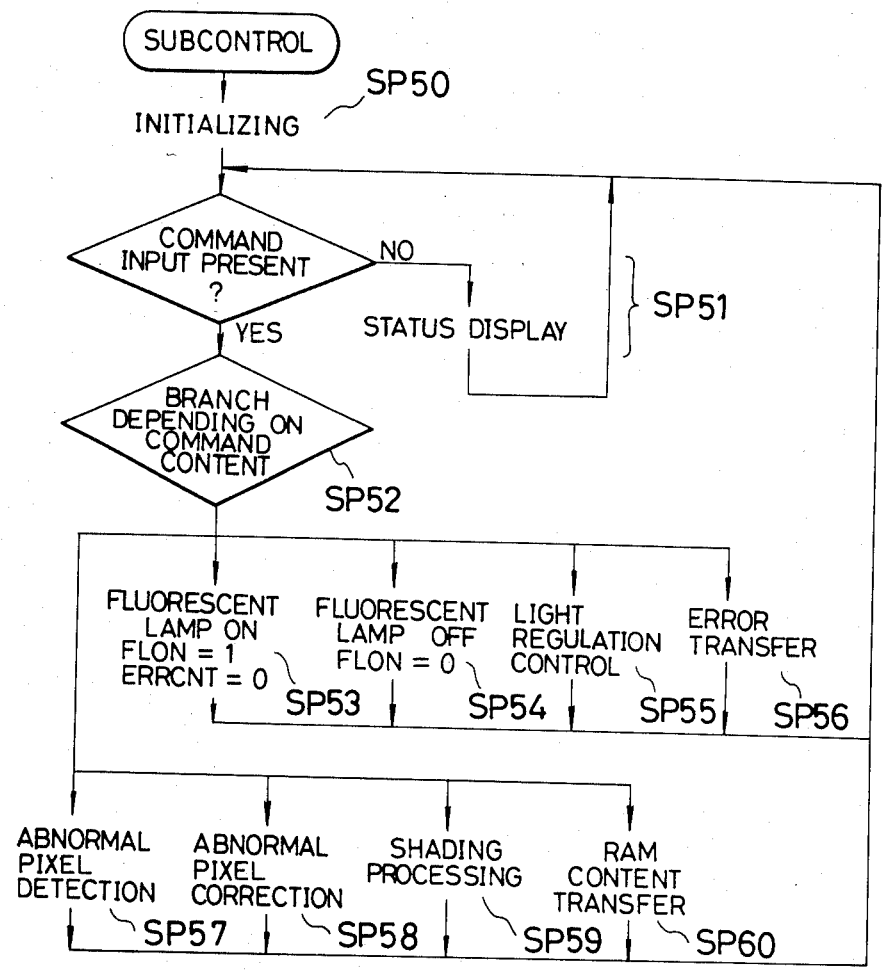
FIGS. 8 and 9 are control charts of a control 21.
Figure 9:
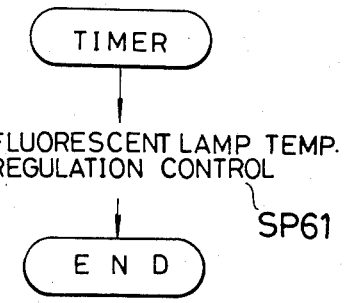

FIGS. 8 and 9 are control flow charts showing the control flow of the CPU 60 of the control 21.

Referring to FIG. 8, after power is turned on, flags, the I/O port 63, the serial circuit 64, and the display circuit 65 and the like are initialized in step SP50. The flow then advances to step SP51.

In step SP51, it is checked if an operation command input from the main body control 23 is present. If NO in step SP51, light and temperature regulation states are displayed at the display circuit 65. If YES in step SP51, the flow advances to step SP52 wherein a branch is made in accordance with each command content. The respective processing corresponding to each command content is as follows:

* Step SP53

The fluorescent lamp 15 is turned on. A flag FLON is set to "1", and a flag ERRCNT is set to "0". The flag counter data referred to in the description of the flow charts herein means data which is written in or read out from the RAM 62 by the CPU 60 for the purpose of processing.

* Step SP54

The fluorescent lamp 15 is turned off, and the flag FLON is set to "0".

* Step SP55

Light regulation is performed.

* Step SP56

The detection error data is transferred to the main body control 23.

* Step SP57

Abnormal pixel detection within one frame is performed.

* Step SP58

Correction of the abnormal pixel detected in step SP47 is performed.

* Step SP59

The image signal obtained by reading the standard white plate 1 is subjected to noise removal and is stored in the RAM 52.

* Step SP60.

The data stored in the RAM 52 is transferred to an external circuit through the serial circuit 64.

After the above processing is completed, the flow returns to step SP1, and the above control flow is repeated.

FIG. 9 shows a timing processing which is executed at a predetermined time period in response to an interrupt signal supplied from the timer 67. This processing is started after the initialization in step SP50 is completed.

In step SP61, the control operation for maintaining the tube wall temperature of the fluorescent lamp 15 at about 40° C., which is suitable for stable light emission, is performed.

A description will now be made with reference to the flow charts shown in FIGS. 10 to 14 which are detailed flow charts corresponding to those shown in FIGS. 8 and 9.

Figure 10:
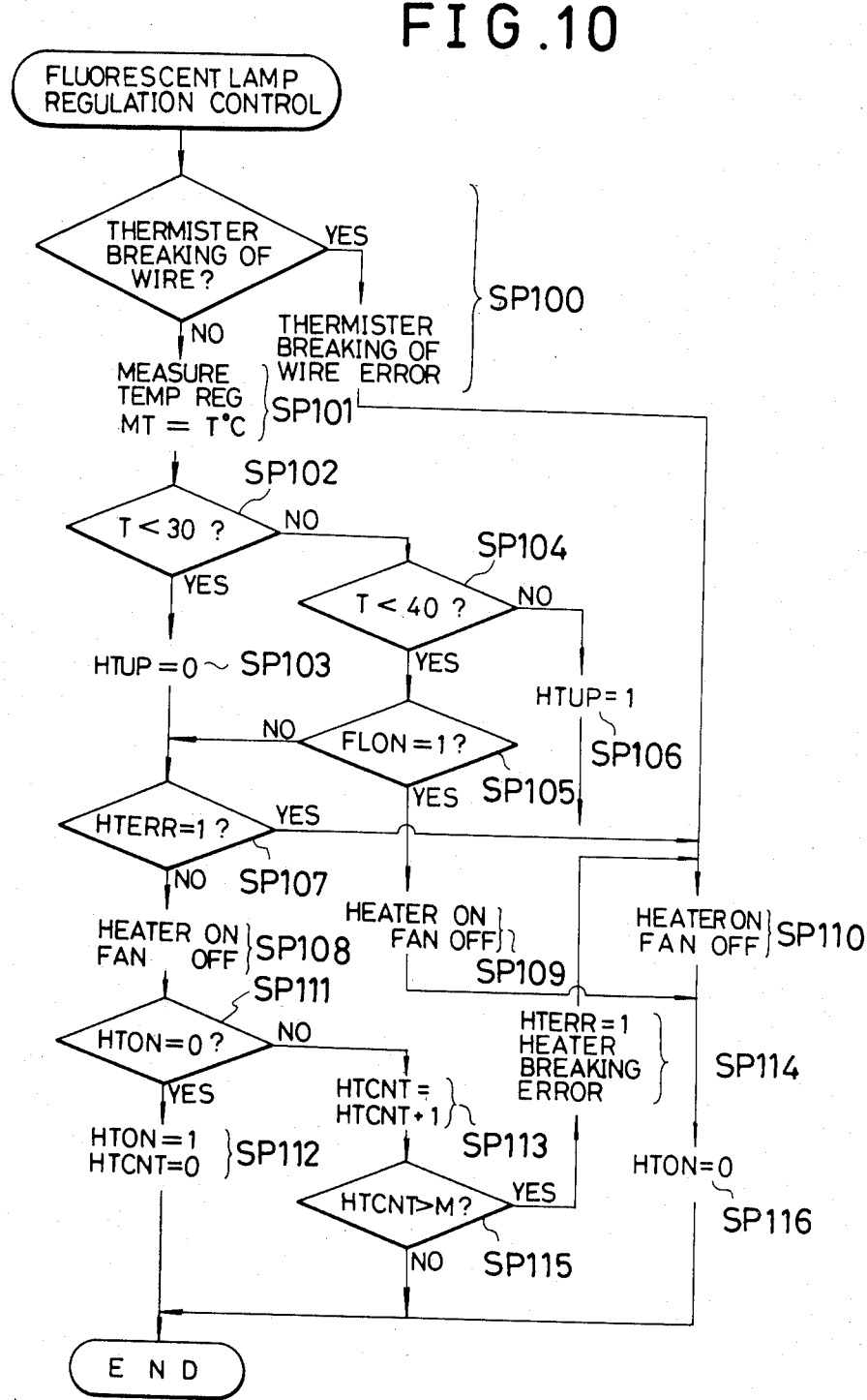
FIGS. 10, 11 consisting of FIGS. 11(A), 11(B) and 11(C), 12, 13 and 14 are detailed control flow charts of the control 21.

FIG. 10 is a flow chart showing in detail the control contents of the temperature regulation of the fluorescent lamp 15 in step SP61. In step SP100, a check is made to determine if a broken wire is detected in the thermistor. If YES in step SP100, the error content is stored in the RAM 62 and an error display is performed in step SP51. Various other errors are similarly processed, and a corresponding error content is transferred to the main body control 23 in step SP56 if such an error is detected.

When YES in step SP100, since temperature regulation cannot be performed, the flow advances to step SP110 wherein the heater 14 is turned off and the fan motor 16 is turned on. When NO in step SP100, the temperature measurement output from the thermistor 13 is converted into a digital signal by the A/D converter 22 and is given as a temperature T °C. in step SP101.

The detection of a broken wire in the thermistor can be performed by determining a break when the temperature T °C. becomes a discrete value which is not normally detectable.

In step SP102, it is checked if the measured temperature T °C. is below 30° C. If NO in step SP102, the flow advances to step SP104 wherein it is checked if the temperature T °C. is below 40° C. When it is determined that T <30, step SP103 is performed. When it is determined that 30 ≦T <40, step SP105 is performed. When it is determined that T ≧40, step SP106 is performed.

In step SP103, a flag HTUP which is set at "1" after completion of the temperature regulation of the fluorescent lamp 15 is set at "0". The flag HTUP set at "0" indicates that the temperature regulation is incomplete. In step SP106, the flag HTUP is set at "1".

In step SP105, it is checked if the flag FLON is set at "1" so as to determine if the fluorescent lamp 15 is ON. When the flag FLON is set at "1", that is, when the fluorescent lamp 15 is ON, the tube wall temperature is increased due to heat generation of the lamp. Therefore, the flow advances to step SP109 wherein the heater 14 is turned off and the fan motor 16 is turned off, so that the measured temperature T °C. gradually approaches 40° C. When it is determined in step SP105 that the flag FLON is set at "0", the flow advances to step SP107.

In step SP107, it is checked if a flag HTERR which is set at "1" upon detection of a broken thermistor wire is set at "1". If YES in step SP107, the flow advances to step SP110 wherein the heater 14 is turned off and the fan motor 16 is turned on so as to perform cooling for safety.

In step SP108, the heater 14 is turned on and the fan motor 16 is turned off so as to increase the tube wall temperature of the fluorescent lamp 15.

In step SP111, it is checked if a flag HTON which is set at "1" when the heater 14 is on is set at "0". If YES in step SP111, the flow advances to step SP112 wherein the flag HTON is set at "1" and a counter HTCNT for counting the conduction time of the heater 14 is cleared to "0".

In step SP113, the counter HTCNT is incremented by 1. In step SP115, when the conduction time counted by the counter HTCNT exceeds an allowable time M, a broken wire of the thermistor is detected, and the flow advances to step SP114.

In step SP114, the flag HTERR is set at "1" and error processing for a broken wire of the thermistor is performed.

The flag HLON is set at "0" in step SP116 after the heater 14 is turned off.

According to the temperature regulation procedures described above, two control temperatures of 30° C. and 40° C. are used to provide hysteresis characteristics. Stable control can thus be performed.

Figure 11B:
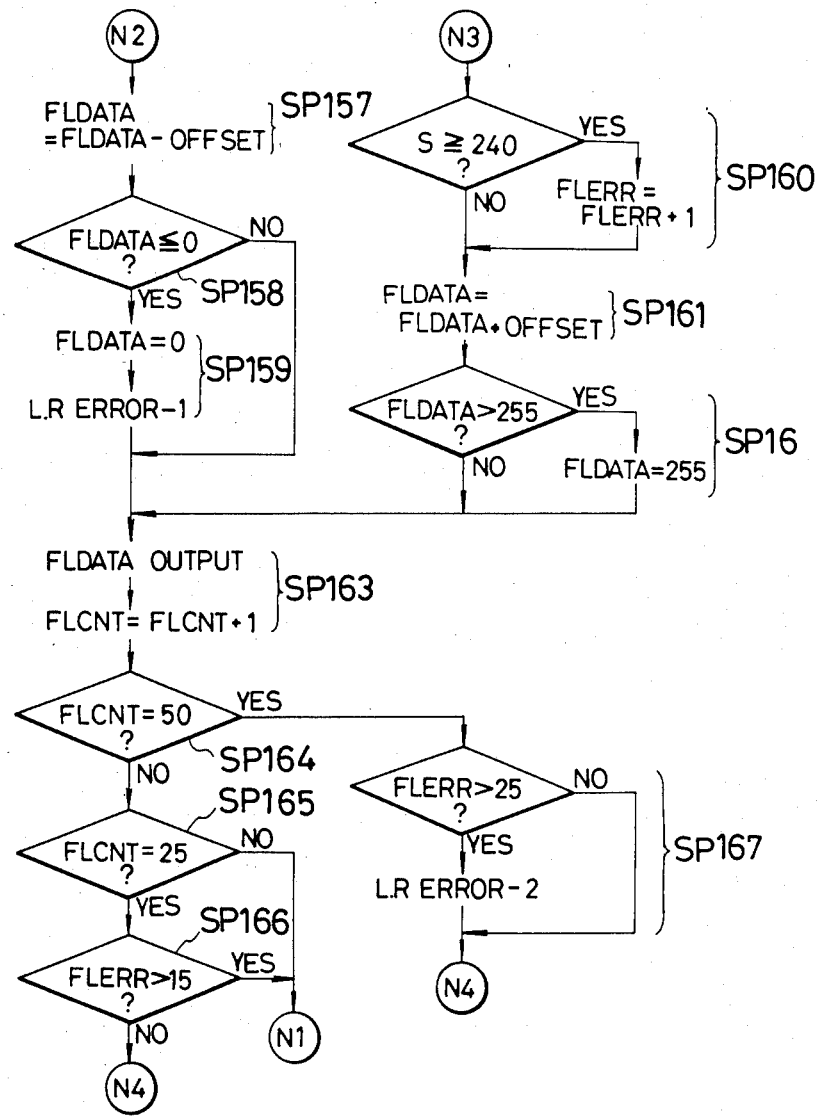
Figure 11C:
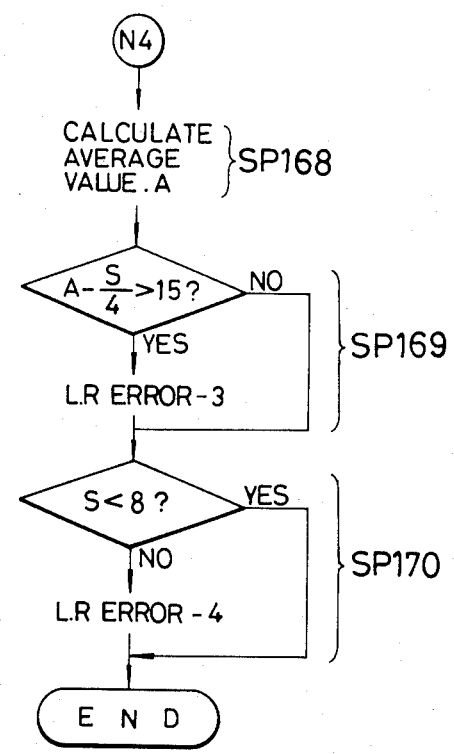

Light regulation of the fluorescent lamp 15 in step SP55 shown in FIG. 8 will now be described with reference to FIG. 11.

Prior to actual control, in step SP150, the flags, data and counter are initialized. Data FLDATA is light regulation data which is to be supplied to the light regulator 18. The value 255 of the data FLDATA indicates the fully ON state, while the value 0 indicates the OFF state. Data OFFSET is an increment/decrement of the data FLDATA. A counter FLCNT is a counter for counting the repeating control operation number. A counter FLERR is a counter for measuring the rising state of the fluorescent lamp 15. The counter FLERR serves to count the number of data representing a very dark state.

The image signal to be processed in this embodiment is a 6-bit signal (values 0 to 63). Since an 8-bit RAM 52 is used, the upper 2 bits can be used for a purpose other than storage of the image signals.

In step SP151, the timer waits until the previous light regulation data appears as a change in the light amount of the fluorescent lamp 15. Then, the flow advances to the next step.

In step SP152, the image signal obtained by reading the standard white plate 1 is stored in the RAM 52 in the shading data sampling mode.

In step SP153, four consecutive pixels of image signal data stored in the RAM 52 are added as one block. A block having a minimum value (brightest block) is detected (=L block; sum S).

In step SP154, the data OFFSET is divided by 2. In step SP155, if it is determined that the data OFFSET has become less than 1, the data OFFSET is set at "1". Then, the value of the data OFFSET changes in the order of 64, 32, 16, 8, 4, 2, 1, 1, and so on.

In step SP156, a branch is made in accordance with the value of the sum S.

In step SP157, the sum is 0, that is, the light amount is assumed to be too great. Therefore, the data OFFSET is subtracted from the data FLDATA so as to decrease the light amount.

In step SP158, it is checked if the value of the data FLDATA has become negative upon the subtraction in step SP157. If YES in step SP158, the data FLDATA is set at "0" and processing for a light regulation error 1 is performed in step SP159.

The light regulation error 1 corresponds to a theoretically impossible state wherein the white level signal is read irrespective of data supplied to the light regulator 18. In this case, a defect of the light regulator 18 or the amplifier 10 is plausible.

When the sum S is not 0, the flow advances to step SP160. In step SP160, it is checked if the sum S is dark data of the maximum value 240 or more in the ON state of the fluorescent lamp 15. When the sum S is determined to be 240 or more, it is determined that the fluorescent lamp 15 is not ON and the counter FLERR is incremented by 1.

Since the light amount is expected to be insufficient, in step SP161, the data OFFSET is added to the data FLDATA to increase the light amount.

In step SP162, it is checked if the data FLDATA exceeds 255. If YES in step SP162, the data FLDATA is set at 255. In this case, a light insufficient amount error is not detected for the following reason. That is, when the fluorescent lamp is turned on, the light amount gradually increases from the switching ON time.

In step SP163, the data FLDATA calculated in step SP157 or SP161 is supplied to the light regulator 18, and the counter FLCNT is incremented by one.

In step SP164, when it is determined that the counter FLCNT has reached 50, light regulation is terminated. In step SP167, it is checked if the counter FNERR exceeds 25. If YES in step SP167, it is determined that the fluorescent lamp 15 cannot be turned on quickly or is not turned on at all. Then, a light regulation error 2 is processed.

In step SP165, it is checked if the counter FLCNT has reached 25. When YES in step SP165, it is checked in step SP166 if the counter FLERR exceeds 15. If YES in step SP166, it is determined that the rising characteristics of the fluorescent lamp 15 are not good. Then, steps SP151 to SP162 are repeated until it is determined that the counter FLCNT reaches 50. After performing 25 or 50 control operations, the flow advances to step SP168.

In step SP168, an average value A of pixels at the ends of the effective pixel interval described with reference to FIG. 5 is calculated for the purpose of noise removal.

In step SP169, a difference between the average value A and a 1-block average value obtained by dividing by 4 the sum S of the brightest block is calculated. When the difference exceeds 15, it is determined that the ends of the fluorescent lamp 15 have become degraded. A light regulation error 3 is processed. End degradation detection and processing of steps SP168 and SP169 are separately performed for each end of the effective pixel interval.

In step SP170, it is checked if the sum S is less than 8 so as to determine if the sum S is close to 0.

When it is determined that the sum S is 8 or more, it is determined that degradation of the fluorescent lamp 15 has progressed to its entirety and the light amount is insufficient. A light regulation error 4 is processed.

In accordance with the light regulation control as described above, a light regulation abnormality can be easily detected. Furthermore, the value of the data OFFSET is rendered variable to facilitate control. When the rising characteristics of the fluorescent lamp are poor, the control time can be prolonged to obtain a satisfactory result.

The control flow for the shading processing in step SP59 shown in FIG. 8 will now be described with reference to FIG. 12.

Figure 12:
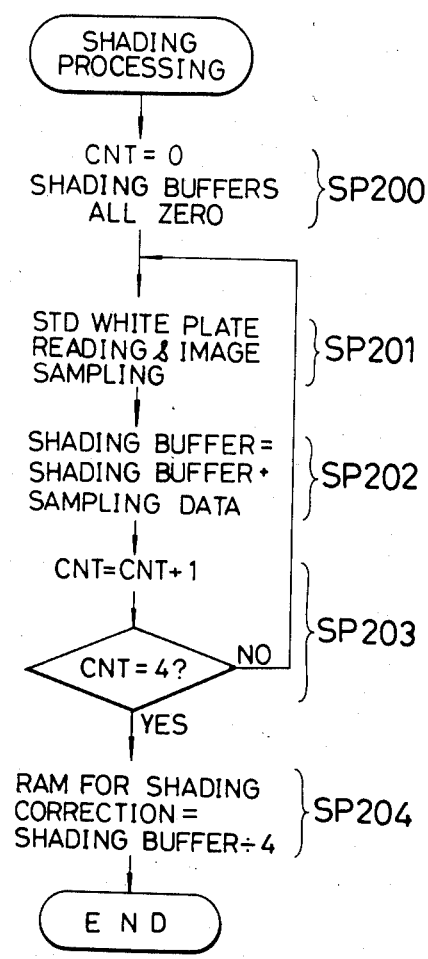

Referring to FIG. 12, a counter CNT is cleared to 0, and all "0" data is written in the shading buffer area of the RAM 62.

In steps SP201 and SP202, the image signal obtained by reading the standard white plate 1 is stored in the RAM 52 is the shading data sampling mode. Furthermore, the data is added to the previous shading buffer content for each pixel, and the obtained data is stored in the shading buffer, thereby updating the shading buffer.

In step SP203, the counter CNT is incremented by 1. Steps SP201 to SP203 are repeated until the counter CNT reaches 4. Thus, the value obtained by reading the standard white plate 1 four times is stored in the shading buffer.

In step SP204, the content of the shading buffer is divided by 4 to obtain an average value of a block. The obtained average value is stored in the RAM 52 (shading correction RAM) to complete the shading processing. Therefore, the noise-removed shading processing data is stored in the RAM 52.

In accordance with the shading processing as described above, an average value of the image signals obtained by reading the standard white plate 1 a plurality of times is calculated to perform noise removal by simply processing the data stored in the RAM 52 and the RAM 62 by the CPU 60. The signal processing is less costly since it does not use any adder, divider or the like. More complex noise removal using a more complex algorithm can be easily performed by modifying the control program stored in the ROM 61.

The control flow for detecting an abnormal pixel will be described with reference to FIG. 13.

Figure 13:
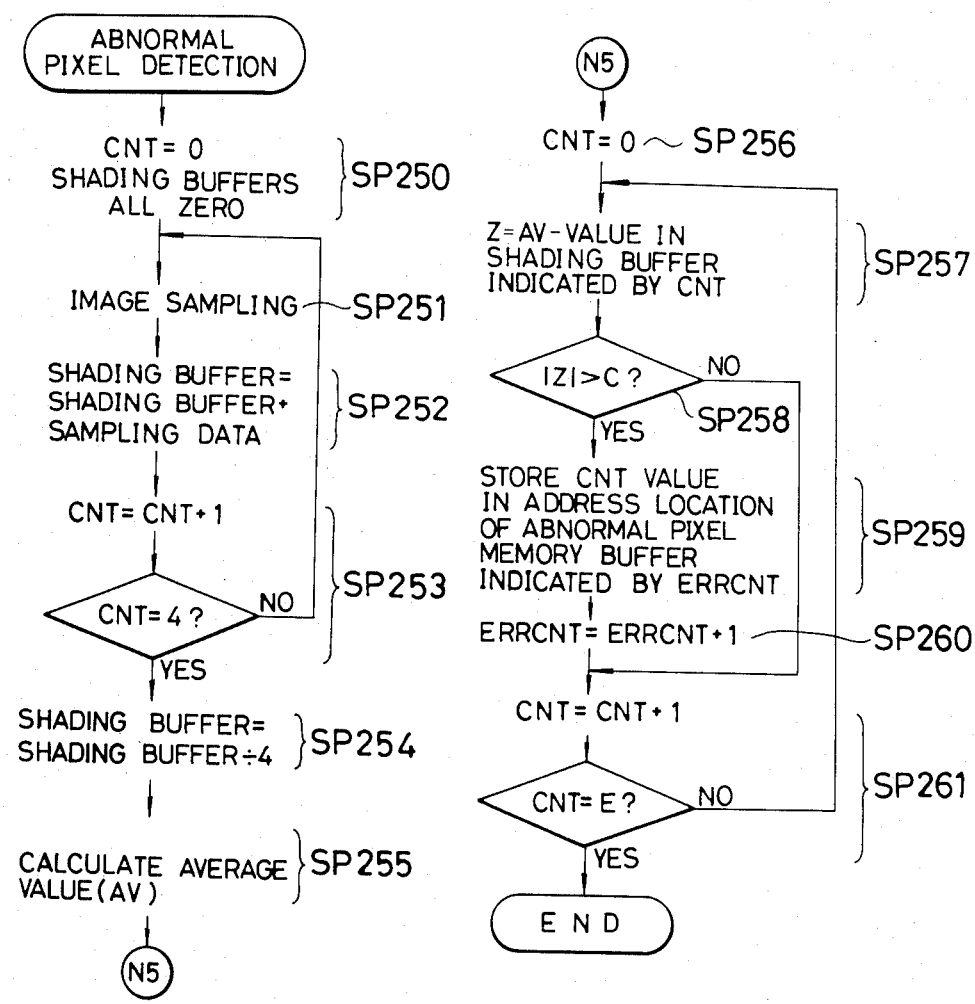

Referring to FIG. 13, steps SP250 to SP253 correspond to steps SP200 to SP203 of the shading processing. When the flow advances to step SP254, the sum of the image data stored in the RAM 52 is similarly stored in the shading buffer.

Abnormal pixel detection is different from the shading processing in that the data stored in the RAM 52 is not only the data after light regulation but also data obtained in the OFF state of the fluorescent lamp 15.

In step SP254, the content of the shading buffer is divided by 4 to calculated an average value.

In step SP255, an average value AV of all the pixels within an effective image interval is calculated and the flow advances to step SP256.

In step SP256, the counter CNT is cleared to 0. Steps SP257 to SP261 are repeated until it is determined in step SP261 that the count has reached the effective pixel number E.

In step SP257, a difference Z between the average value AV and the value of the shading buffer designated by the count of the counter CNT (for example, when the count of the counter CNT is 1000, the data from the start to 1000 in the shading buffer is designated) is calculated.

In step SP258, it is checked if the absolute value of the difference Z exceeds a predetermined value C. When YES in step SP258, since the error is great, an abnormal pixel is detected, and the flow advances to step SP259.

In step SP259, the count of the counter CNT is written at the abnormal pixel storing buffer address (part of the RAM 62) which is designated by the count of the counter ERRCNT which is cleared in step SP53 in FIG. 8. This count is accumulated as an address of the abnormal pixel, thus detecting and storing the address of the abnormal pixel.

In step SP260, the count of the counter ERRCNT is incremented by 1.

The abnormal pixel detection as described above is performed in the OFF state of the fluorescent lamp 15 and in the OFF and light-regulated state thereof. Therefore, even if the difference between a normal pixel and abnormal pixel is small, the abnormal pixel can be reliably detected. The accumulated result of two detection operations can also be obtained.

Figure 14:
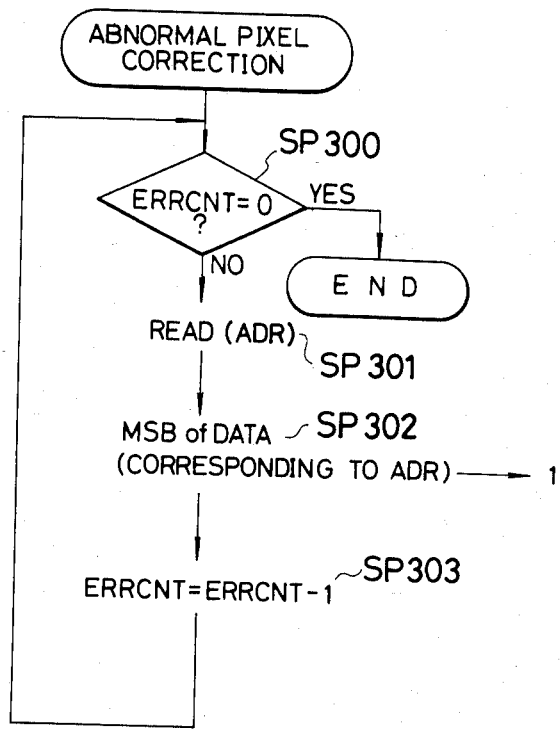

FIG. 14 is a flow chart showing the control flow of abnormal pixel detection in step SP58 in FIG. 8 for replacing an abnormal pixel with an immediately preceding normal pixel.

Step SP300 is a processing step for terminating the processing when the count of the counter ERRCNT reaches 0. When the count is not 0, the processing of steps SP301 to SP303 is performed once.

In step SP301, the content of the abnormal pixel storing buffer from the start to the address (ADR) designated by the count of the counter ERRCNT is read out.

In step SP302, the MSB of the data corresponding from the start to the ADR address of the shading correction RAM 52 is set at 1.

In this embodiment, when the MSB of the RAM 52 is set at 1, the abnormal pixel is replaced by an immediately preceding normal pixel. In step SP302, the MSB at the address ADR is set at 1. However, timing shift occurs depending upon the circuit configuration. Therefore, the MSB of the data immediately before or after the address ADR can be used.

A description will now be made with reference to FIG. 15.

Figure 15:
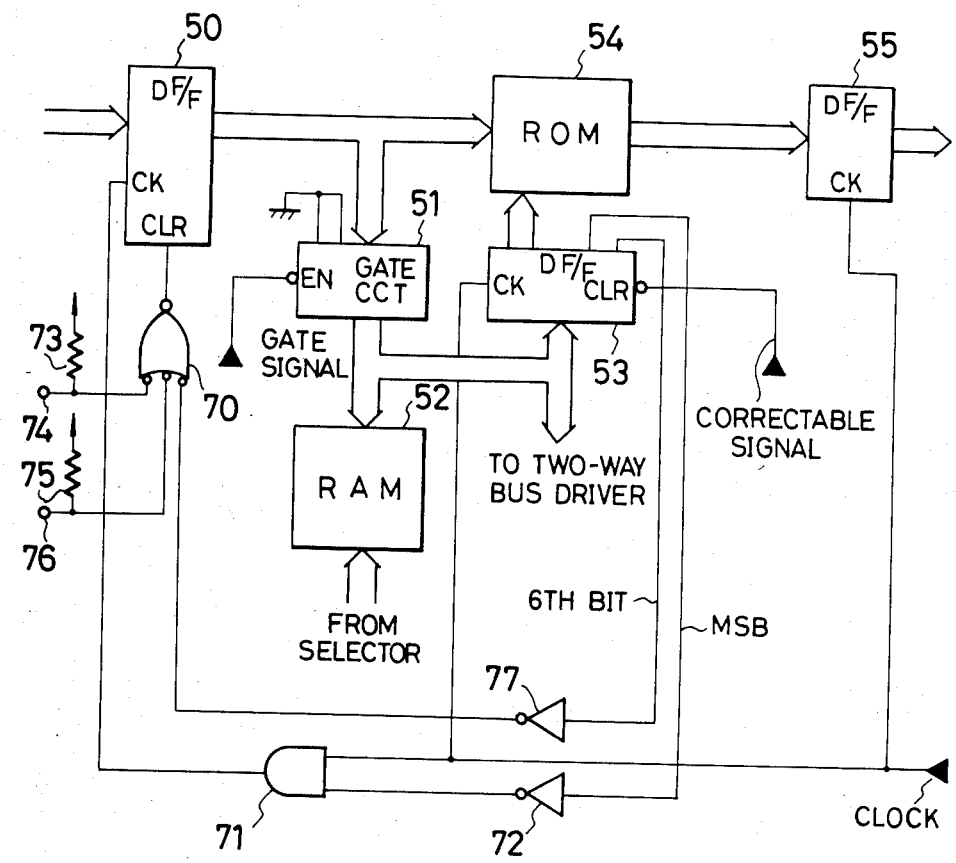
FIG. 15 is a block diagram of a circuit for correcting an abnormal pixel and for generating a test pattern.

FIG. 15 is a detailed block diagram of the circuit around the RAM 52 and ROM 54 in the block diagram shown in FIG. 3.

The D F/F 50 is a 6-bit D-type flip-flop such as TTL74LS174 and has a clock input terminal CK and a clear input terminal CLR in addition to the data input terminal and the data output terminal. When the clear input terminal is set at "0", the data output terminal is set at "0". When a rise clock is supplied to the clock input terminal CK, a signal supplied to the data input terminal is held.

Therefore, if the clear input terminal of the D F/F 50 is pulled up and a signal supplied to the data input terminal is disconnected, an all "0" or an all "1" pseudo image signal pattern can be generated in accordance with the signal supplied to the clear input terminal. If the signal supplied to the clock input terminal is set such that a rise signal is not generated at an abnormal pixel, the data output terminal continues to produce the normal pixel held in the previous clock period, thereby correcting the abnormal pixel.

An AND gate 71 and an inverter 72 are for abnormal pixel correction, and an AND gate 70 and an inverter 77 are a logic circuit for generating a pattern.

Input terminals 74 and 76 of the AND gate 70 are pulled up by resistors 73 and 75, respectively. When a pattern generation is to be performed, the input terminals 74 and 76 receive a horizontal address signal from the counter 58 and a vertical address signal from the counter 59 shown in FIG. 3, respectively, thereby generating a pattern as shown in FIG. 16.

Figure 16:
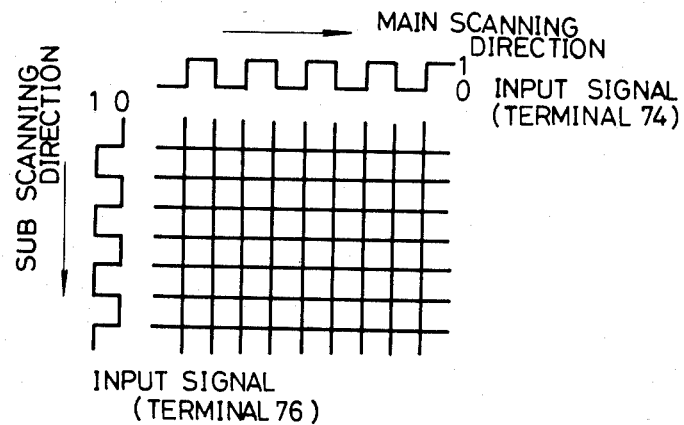
FIG. 16 is a diagram showing an example of a pattern.

FIG. 16 shows an example of an image pattern when the data input terminal of the D F/F 50 is opened, and horizontal and vertical address signals are supplied to the input terminals 74 and 76, respectively, so that the resultant pattern has the same pitch in both the main and sub scanning direction.

The hatched areas correspond to the all-1 data appearing at the data output terminal of the D F/F 50.

The pitch or shape of the pattern in the main or sub scanning direction can be changed by selecting each input address line signal. For example, a stripe pattern can be obtained by connecting only one input address signal.

When the bit 6 (when the LSB is the bit 0, bits 0 to 5 are assigned for image signal storing, and the bit 6 or the MSB is assigned for abnormal pixel detection) is used and a desired all "0" or all "1" pattern is written in the CPU 60, a similar effect can be obtained. In this case, when the bit 6 of the RAM 52 is set at "1", the data output terminal of the D F/F 50 becomes all "0".

Likewise, when "1" is written in the MSB of the RAM 52, the CLOCK signal is gated by the AND gate 71. Then, the data of the corresponding pixel by the D F/F 50 is not produced and the data held in the previous clock period is produced. In this manner, correction of an abnormal pixel correction is performed.

Referring to FIG. 15, the D F/F 50 corrects the abnormal pixel and generates a pattern. However, these operations may be performed by a subsequent D F/F 55. Alternatively, the correction of an abnormal pixel can be performed by the D F/F 50, and generation of a pattern can be performed by the D F/F 55.

The gate circuit 51 can comprise a tristate buffer TTL74LS244 or the like. The timing control 66 controls the gate control signal. When the input signal is "0", the image signal is written in the RAM 52. In this case, when the MSB or the bit 6 of the input signal is connected to GND, "0" is written in the two bits of the RAM 52.

The D F/F 53 can comprise, for example, TTL74LS273. The clear terminal CLR is used as a correction enable terminal. When the input signal to this terminal is "1", shading correction is performed in accordance with the data stored in the RAM 52. When the input signal to this terminal is at "0", shading correction is not performed.

The correction enable signal is normally set at "1" by a DIP switch or the like and is set at "0" when it is checked to see if the shading is being performed normally.

Although the present invention has been described with reference to a particular embodiment, the present invention is not limited to this. Various other changes the modifications may be made within the spirit and scope of the present invention.

What is claimed is:

1. An image reading apparatus comprising:
a light source;
reading means for photoelectrically reading an image in accordance with an optical image of a member illuminated with light from said light source;
a standard surface as a standard for reading of the image by said reading means;
control means for controlling the amount of light emitted by said light source in accordance with a read signal obtained by reading the standard surface by means of said reading means; and
correcting means for correcting an image read signal from said reading means in accordance with the read signal obtained by reading the standard surface by means of said reading means,
wherein said correcting means corrects the image read signal beginning after the amount of light emitted by said light source becomes a predetermined value under control of said control means.

2. An apparatus according to claim 1, wherein said correcting means corrects non-uniformity of the read signal obtained by said reading means.

3. An apparatus according to claim 1, wherein said correcting means corrects an abnormal output among outputs from a plurality of reading elements constituting said reading means.

4. An apparatus according to claim 1, wherein said control means comprises detecting means for detecting an abnormal output of said light source.

5. An image reading apparatus comprising:
reading means for photoelectrically reading an image;
a standard surface as a standard for reading the image by said reading means;
means for forming a standard signal based on read signals obtained by reading the standard surface a plurality of times by said reading means; and
correcting means for correcting an image read signal from said reading means in accordance with the standard signal.

6. An apparatus according to claim 5, wherein said forming means forms the standard signal by averaging the read signals obtained by reading the standard surface a plural number of times.

7. An apparatus according to claim 5, wherein said correcting means corrects non-uniformity of the read signals from said reading means.

8. An apparatus according to claim 5, wherein said correcting means corrects an abnormal output among outputs from a plurality of reading elements constituting said reading means.

9. An image reading apparatus comprising:
reading means for photoelectrically reading an image in units of pixels;
a light source used for the image reading operations by said reading means;
actuating means for actuating said reading means to allow said reading means to perform reading operations under two different conditions of ON and OFF states of said light source; and
means for detecting an abnormal pixel signal among read signals from said reading means in accordance with a plurality of standard read signals obtained by performing a plurality of reading operations by said reading means under the different conditions.

10. An apparatus according to claim 9, further comprising correcting means for correcting the abnormal pixel signal detected by said detecting means.

11. An apparatus according to claim 9, further comprising a standard surface as a standard for reading of the image by said reading means, said detecting means detecting the abnormal pixel signal in accordance with standard read signals obtained when said reading means reads said standard surface.

12. An image reading apparatus comprising:
reading means for photoelectrically reading an image in units of pixels;
detecting means for detecting an abnormal pixel signal produced by said reading means;

storing means for storing a pixel position of the abnormal pixel signal detected by said detecting means; and correcting means for replacing an image read signal of the pixel position stored in said storing means with an image signal of another pixel position in accordance with the storage information of said storing means.

13. An apparatus according to claim 12, further comprising a standard surface as a standard for reading the image by said reading means, said detecting means detecting the abnormal pixel signal in accordance with a signal obtained when said reading means reads the standard surface.

14. An apparatus according to claim 12, wherein said correcting means replaces an image signal of the pixel position stored in said storing means with an image signal of an immediately preceding pixel position.

15. An apparatus according to claim 12, further comprising means for forming an average value of a predetermined number of pixel signals which are produced by said reading means, said detecting means detecting the abnormal pixel signal in accordance with a difference between the average signal and each of the pixel signals from the reading means.

16. An apparatus according to claim 12, further comprising inhibit means for inhibiting an image reading operation of said reading means when the number of abnormal pixel signals detected by said detecting means exceeds a predetermined number.

17. An image reading apparatus comprising:
a light source;
reading means for photoelectrically reading an image in accordance with an optical image from a member illuminated with light from said light source;
a standard surface as a standard for reading of the image by said reading means;
control means for controlling an amount of light emitted by said light source in accordance with the signal obtained when said reading means reads said standard surface illuminated with the light from said light source; and
detecting means for detecting an abnormal pixel signal in accordance with a signal obtained when said reading means reads the standard surface illuminated with the light from said light source.

18. An apparatus according to claim 17, further comprising inhibit means for inhibiting an image reading operation of said reading means when said detecting means detects the presence of the abnormal pixel signals in a number exceeding a predetermined number.

19. An apparatus according to claim 17, further comprising means for forming an average value of a predetermined number of pixel signals which are produced by said reading means upon reading the standard surface, wherein said detecting means detects the abnormal pixel signal in accordance with a difference between the average signal and each of the pixel signals from said reading means.

20. An apparatus according to claim 17, further comprising correcting means for correcting the abnormal pixel signal detected by said detecting means.

21. An apparatus according to claim 20, further comprising means for storing a pixel position of the abnormal pixel signal detected by said detecting means, said correcting means correcting the abnormal pixel signal in accordance with a storage content in said storing means.

22. An image reading apparatus comprising:
a light source;
reading means for photoelectrically reading an image in accordance with an optical image of a member illuminated with light from said light source;
detecting means for detecting a peak value of an amount of light from said light source in accordance with an output from said reading means; and
control means for controlling the amount of light from said light source such that the peak value of the amount of light is kept at a predetermined value.

23. An apparatus according to claim 22, wherein a standard surface of a standard density is illuminated with the light from said light source, and said detecting means operates in accordance with a signal output from said reading means when said reading means reads the standard surface.

24. An apparatus according to claim 22, further comprising inhibit means for inhibiting an image reading operation of said reading means when the amount of light from said light source by said control means cannot be performed.

25. An image reading apparatus comprising:
a light source;
reading means for photoelectrically reading an image in accordance with an optical image of a member illuminated with light from said light source;
heating means for heating said light source;
cooling means for cooling said light source;
detecting means for detecting a temperature of said light source; and
control means for controlling said heating and cooling means in accordance with a detection result of said detecting means so as to keep said light source at a predetermined temperature.

26. An apparatus according to claim 25, wherein said control means operates in different modes in accordance with ON and OFF states of said light source.

27. An image reading apparatus comprising:
a light source;
reading means for photoelectrically reading an image in accordance with an optical image illuminated with light from said light source;
detecting means for detecting a temperature of said light source; and
inhibit means for inhibiting an image reading operation of said reading means when the temperature of said light source detected by said detecting means is not a predetermined temperature.

28. An apparatus according to claim 27, further comprising control means for controlling the temperature of said light source in accordance with the temperature of said light source detected by said detecting means.

29. An apparatus according to claim 27, wherein said detecting means has display means for displaying the detection result.

30. An image reading apparatus comprising:
a light source;
reading means for photoelectrically reading an image in accordance with an optical image of a member illuminated with light from said light source;
first control means for controlling a temperature of said light source; and
second control means for controlling an amount of light of said light source;
wherein said second control means controls the amount of light after the temperature of said light source becomes a predetermined value under temperature control by said first control means.

31. An apparatus according to claim 30, wherein said second control means controls the amount of light in accordance with an output from said reading means.

32. An image reading apparatus comprising:
a light source;
reading means for photoelectrically reading an image in accordance with an optical image from a member illuminated with light from said light source;
a standard surface as a standard for reading of the image by said reading means; and
detecting means for detecting an abnormality of said light source in accordance with a signal obtained when said reading means reads said standard surface illuminated with the light from said light source.

33. An apparatus according to claim 32, further comprising control means for controlling an amount of light emitted by said light source in accordance with the signal obtained when said reading means reads said standard surface illuminated with the light from said light source.

34. An apparatus according to claim 32, further comprising inhibit means for inhibiting an image reading operation of said reading means when said detecting means detects an abnormality of said light source.

35. An apparatus according to claim 32, wherein said detecting means has display means for displaying a detection result.

36. An apparatus according to claim 32, wherein said light source is a rod-like light source, and said detecting means detects the abnormality of said light source in accordance with whether an amount of light at an end of said light source is at a predetermined value.

37. An apparatus according to claim 32, wherein said detecting means detects the abnormality of said light source in accordance with whether a maximum amount of light emitted by said light source is at a predetermined value.

38. An apparatus according to claim 32, further comprising correcting means for correcting an image read signal from said reading means in accordance with a signal obtained by reading the standard surface by said reading means.

* * * * *